United States Patent [19]
Watanabe

[11] 4,050,791
[45] Sept. 27, 1977

[54] FILTER HOLDER INSERTABLE INTO THE LENS BARREL OF A CAMERA

[75] Inventor: Sataya Watanabe, Kawasaki, Japan

[73] Assignee: Nippon Kogaku K.K., Tokyo, Japan

[21] Appl. No.: 642,543

[22] Filed: Dec. 19, 1975

[30] Foreign Application Priority Data

Dec. 28, 1974 Japan .................................. 50-1393

[51] Int. Cl.² .................. G02B 7/00; G03B 17/00; G02B 7/02
[52] U.S. Cl. ..................... 350/318; 350/251; 350/257; 354/286
[58] Field of Search ............... 350/251, 252, 257, 246, 350/318, 247, 311, 256; 353/84; 354/286, 287, 295, 100, 189; 292/296, DIG. 45

[56] References Cited
U.S. PATENT DOCUMENTS

| | | | |
|---|---|---|---|
| 1,228,389 | 6/1917 | Barnes | 350/318 |
| 2,353,898 | 7/1944 | Nitsch | 350/318 |
| 2,420,379 | 5/1947 | Mills | 350/318 |

*Primary Examiner*—Edward S. Bauer
*Assistant Examiner*—Stewart Levy
*Attorney, Agent, or Firm*—Shapiro and Shapiro

[57] ABSTRACT

The body of a filter holder carrying a filter has a slot in which an engaging member is disposed for rotation between first and second positions in response to rotation of a shaft to which the engaging member is attached. In a first position of the shaft, retaining means on the engaging member is retracted within the slot for effecting insertion of the holder into a lens barrel. In a second position of the shaft, the retaining means projects from and is engageable with the lens barrel for retaining the body thereto.

9 Claims, 5 Drawing Figures

FILTER HOLDER INSERTABLE INTO THE LENS BARREL OF A CAMERA

BACKGROUND OF THE INVENTION

1. Field of the Invention

This invention relates to a filter holder insertable into the lens barrel of a camera, and a lens barrel having a filter holder positively secured thereto.

2. Description of the Prior Art

Photography is usually carried out with a filter mounted on the picture-taking lens. Several methods of mounting a filter to a picture-taking lens are known. The most widely adopted method involves screwing the filter into the front end of the lens barrel. However, when using a telephoto lens, which usually has a large forward lens element, this method requires a large filter element which is bulky and disadvantageous in terms of ease of handling and manufacturing cost. A second method involves self-contained filters, but this approach limits the available filters to four or five types and requires a complex mechanism to enable selective positioning of the filters. A third method involves screwing the filter into the rear end of the lens barrel, but this requires removal of the lens barrel from the camera body each time the filter is to be changed. A need exists, therefore, for a filter which may be simply attached to lenses having a large forward lens element but which requires only a small diameter filter and which can be positively attached to the camera to prevent the filter from dropping out when the camera is inverted.

It is an object of the present invention to provide a new and improved filter holder which overcomes the deficiencies of the prior art and enables a filter to be positively attached to a lens barrel by a simple operation.

SUMMARY OF THE INVENTION

According to the present invention, the body of a filter holder carrying a filter has a slot in which an engaging member is disposed for rotation between first and second positions in response to rotation of a shaft to which the engaging member is attached. In a first position of the shaft, retaining means on the engaging member is retracted within the slot for effecting insertion of the holder into a lens barrel. In a second position of the shaft, the retaining means projects from and is engageable with the lens barrel for retaining the body thereto.

BRIEF DESCRIPTION OF THE DRAWINGS

An embodiment of the invention is shown in the accompanying drawings wherein.

DESCRIPTION OF THE PREFERRED EMBODIMENTS

Figure 1:
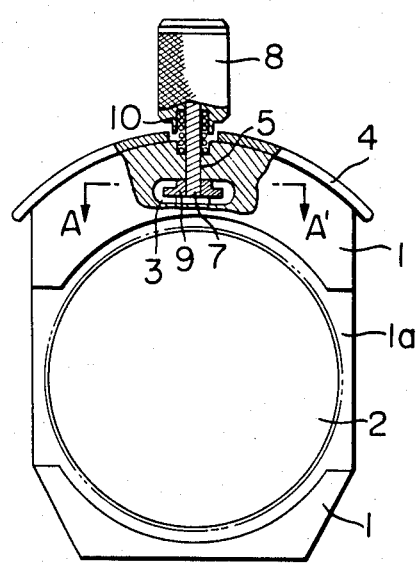
FIG. 1 is a front view, partly in cross-section, of a filter holder made in accordance with the invention.
Figure 2:
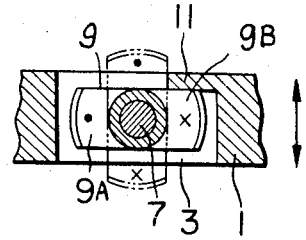
FIG. 2 is a view taken along lines A-A' in FIG. 1.

Referring to FIGS. 1 and 2, a holder body 1 has an aperture 2 and a slot 3 formed in the upper portion thereof, as will be further be described. Stepped portion 1a of the holder body is formed with threads for engagement with the threads on a filter mount described below. A holder cover 4 is integrally formed with the body 1 and serves to limit the insertion of the body 1 into a lens barrel. The body has a hole 5 in commmunication with the slot 3. A shaft 7 is rotatably fitted in the hole 5, and a knob 8 is fixed to the outwardly projecting end of the shaft. An engaging member 9, described below, is supported on the other end of the shaft 7, and is disposed in slot 3. A compression spring 10 surrounding the shaft 7 is interposed between the knob 8 and the body 1 to normally urge the engaging member 9 against the body 1 at the upper side of the slot 3.

As shown in FIG. 2, the engaging member 9 is elongated with retaining means 9A and 9B at opposite longitudinal ends, and the shaft 7 is centrally located therein. The length or longitudinal dimension of the member 9 from retaining means 9A to 9B is less than the lateral width of slot 3, but greater than the thickness of body 1. The slot 3 is formed to provide a stop 11 for limiting the rotation of the engaging member 9. This stop is engaged by retaining means 9B of the engaging member 9 upon its rotation in one direction, and defines the first angular position of the member 9, the shaft 7 and its knob 8. The second angular position of the shaft 7 is defined when the member 9 is rotated in the opposite direction until retaining means 9A engages the stop. Rotation of the engaging member 9 is thus limited to about 90°. In other words, the retaining means on the engaging member 9 assume a retracted position indicated by the solid line showing in FIG. 2 wherein the retaining means are accommodated within the slot 3, and a projected position indicated by the phantom lines wherein the retaining means project outwardly of the slot.

Figure 3:
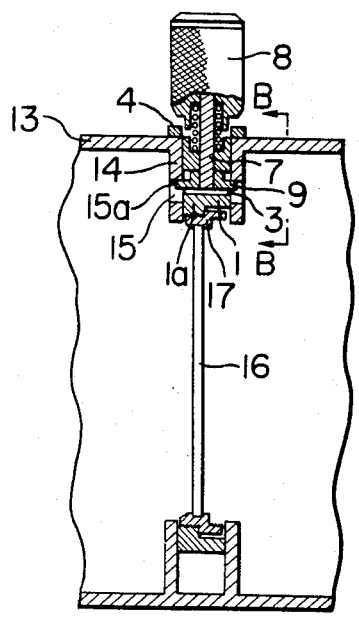
FIG. 3 is a vertical cross-sectional view of the filter holder when it is secured to a lens barrel.

As shown in FIG. 3, a guide member 14 is provided on the lens barrel 13 and forms a filter receiving portion for receiving the filter holder. The guide member has opposite walls spaced apart a distance equal to the thickness of holder body 1, the walls being formed with an engaging opening 15 substantially corresponding in position to the slot 3 in the filter holder when the latter is inserted into the guide member of the barrel. The glass 16 of the filter is surrounded by a frame 17 which has threads on its periphery for engaging the threads on stepped portion 1a.

Figure 4:
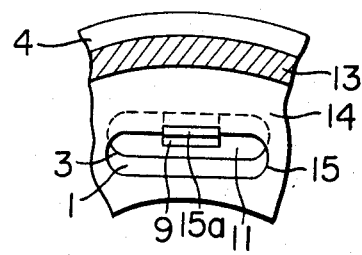
FIG. 4 is a view taken along lines B-B' in FIG. 3.

As shown in FIG. 4, an engaging notch 15a is formed in the upper edge of each engaging slot or opening 15, and is engageable by a retaining means on engaging member 9 of the filter holder. Alternatively, a notch may be provided in the lower edge of each slot 15, but in such case knob 8 would be spring biased inwardly rather than outwardly as illustrated.

The operation of the device of the invention will now be described.

A filter 16, 17 to be used is first threadably inserted into holder body 1. The filter can readily be mounted with the aid of the stepped portion 1a. Subsequently, the filter holder is inserted into the filter receiving portion or guide member 14 on the lens barrel 13 (FIG. 3) with the engaging member 9 brought into retracted position shown in solid-lines in FIGS. 1 and 2. If the engaging member 9 were in the extended position shown in phantom-lines in FIG. 2, the member 9 would interfere with insertion. Therefore, engaging member 9 must be brought to the solid-line position of FIG. 2 by rotating knob 8 in a direction in which rotation is permitted and until further rotation is stopped by the engagement of member 9 with stop 11. Insertion is completed when the holder cover 4 seats against the outer periphery of the lens barrel 13. When this occurs, slot 3 of the holder is almost in registration with slot 15 of the guide member 14, but is slightly upwardly offset relative thereto.

Next, the knob 8 is depressed against the force of the spring 10 and then rotated for causing the retaining means 9A and 9B of the engaging member 9, previously accommodated in the slot 3, to move into slots 15. Rotation continues until one of the ends of member 9 strikes the stop 11, whereupon the knob 8 is released. Due to the biasing force of the spring 10, the retaining means 9A and 9B of the engaging member 9 snap into the engaging notches 15a of slots 15, thus positively securing the filter to the lens barrel, as shown in FIGS. 3 and 4.

To visually confirm the engagement between the engaging member 9 and the engaging notches 15a when the filter holder is in its inserted position, the top surface of the knob 8 may be engraved with a suitable index mark (not shown).

Removal of the filter holder is accomplished by first depressing the knob 8 against the spring bias to move the retaining means 9A and 9B out of notches 15a, and then rotating the knob to move the retaining means from their extended to their retracted position. After this, the filter holder can be withdrawn from the lens barrel by exerting an outward pull on knob 8.

The engagement of member 9 with slots 15 may also be accomplished without using notches 15a, but this arrangement raises the possibility that disengagement may occur due to vibration or the like. However, by providing notches 15a, the engaging member 9 will be urged into the notches by spring 10, and the member will be prevented by the notches from easily rotating in either direction thus indicating to the user that the filter is positively fixed to the lens barrel.

If the opposite ends of the engaging member are made separate from but expandible on the member, the engaging slot 15 need not be provided, and end notches 15a' along will suffice. In such case, however, either the walls defining the notches 15a' or the end portion of the opposite ends of the engaging member would have to be rounded in order to assist in seating and unseating of the opposite ends.

Figure 5:
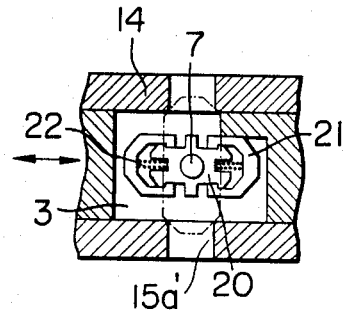
FIG. 5 shows another form of the engaging member in the filter holder.

FIG. 5 shows the above described modification as comprising member 20 rigidly attached to shaft 7, and a pair of retaining members 21 slidably mounted on opposite ends of member 20 for sliding movement in the directions of the double-headed arrow. Springs 22 serve to normally bias members 21 outwardly relative to shaft 7. Thus, members 20 and 21, and springs 22 together constitute an engaging member expansible in the direction of the double-headed arrow.

Preferably, the full length of the arrangement comprising the parts 20, 21, 22 in its normal condition (i.e., the full length in its expanded condition) is less than the lateral width of the slot 3 and greater than the depth of groove 3 which is defined by the thickness of the holder body 1. When knob 8, and thereby the shaft 7, is rotated clockwise from its position in FIG. 5, the ends of each slidable member 21 will engage the inner wall portion of the guide member 14, but the engagement causes slidable members 21 to be cammed inwardly against the force of springs 22 until members 21 are aligned with notches 15a'. At that point, members 21 snap into the notches 15a' firmly securing the filter holder to the lens barrel. While a double-sided engaging member is shown in FIG. 5, it is obvious that a single-sided engaging member could be used if desired. Note also that the full length of member 20, 21 and 22 could be greater than the lateral width of slot 3 so that the opposite ends of the slot maintain members 21 retracted when the engaging member is in its first position.

According to the present invention as described above, the filter holder may be attached to or removed from a lens barrel by a very simple operation; namely, by the simultaneous depression and rotation of a knob. In addition, once the holder has been mounted on the lens barrel, the engaging member remains trapped in an engaging notch by a spring force, so that the filter holder cannot become separated from the lens barrel when the barrel is inverted as the camera is carried, for example, or when something accidentally touches the knob, or when the camera is subject to great vibration.

It is believed that the advantages and improved results furnished by the device of the invention will be apparent from the several preferred embodiments thereof as hereinbefore described. Various modifications and changes may be made without departing from the spirit and scope of the invention as sought to be defined in the following claims.

I claim:

1. In combination, a lens barrel of a camera and a filter holder, the filter holder comprising a body for carrying a filter, the body having a slot; the lens barrel having a guide member comprising a pair of walls spaced apart a distance to slideably receive said body; an engaging member disposed in the slot and mounted on the body for rotation between first and second positions; and retaining means on the engaging member having a retracted position when the engaging member is in its first position to enable insertion of the holder between said walls, and having an extended position projecting beyond the body when the engaging member is in its second position, at least one of said walls having an aperture to receive said retaining means when the engaging member is in its second position.

2. A filter holder according to claim 1 wherein retaining means are provided on opposite ends of the engaging member, and aligned apertures are provided in the walls.

3. A filter according to claim 1 wherein the body has a stop engageable by one portion of the engaging member when the latter is in its first position, and engageable by another portion of the engaging member when the latter is in its second position.

4. A filter holder according to claim 3 including a shaft rotatable in the body, a knob on one end of the shaft for rotating the same, the engaging member being disposed on the other end of the shaft whereby the engaging member is movable between its first and second position in response to rotation of the knob.

5. A filter holder according to claim 4 wherein the engaging member is elongated in a direction perpendicular to the shaft which is attached to the engaging member, the longitudinal dimension of the engaging member being less than the lateral width of the slot but greater than the thickness of the body, whereby the free ends of the member project from the body when the engaging member is in its second position.

6. A filter holder according to claim 4 including a spring for biasing the shaft and the knob relative to the body to urge the engaging member against an edge of the slot.

7. A filter holder accordng to claim 3 wherein the retaining means of the engaging member includes a slide member biased away from the axis of rotation of the shaft.

8. A filter holder according to claim 3 wherein the retaining means of the engaging member includes a pair of opposite slide members biased in opposite directions from the shaft, the slide members being contained within the slot when the engaging member is in its first position, but projecting from the slot when the engaging member is in its second position.

9. A filter holder according to claim 1 wherein the body has means for releasibly attaching a filter thereto.

* * * * *